United States Patent [19]

Izumiya

[11] 4,395,612
[45] Jul. 26, 1983

[54] POWER SOURCE CIRCUIT FOR ELECTRIC DISCHARGE MACHINE

[75] Inventor: Syunzo Izumiya, Hachioji, Japan

[73] Assignee: Fujitsu Fanuc Limited, Tokyo, Japan

[21] Appl. No.: 233,501

[22] Filed: Feb. 11, 1981

[30] Foreign Application Priority Data

Feb. 16, 1980 [JP] Japan .................................. 55-18049

[51] Int. Cl.³ .............................................. B23P 1/02
[52] U.S. Cl. ................................ 219/69 P; 219/69 C; 219/69 S
[58] Field of Search ................... 219/69 S, 69 P, 69 C

[56] References Cited

U.S. PATENT DOCUMENTS 3,614,368 10/1971 Lobur ................................ 219/69 C
3,697,719 10/1972 Verner et al. ..................... 219/69 S
3,855,443 12/1974 Bell, Jr. et al. .................... 219/69 S
4,071,729 1/1978 Bell, Jr. ............................. 219/69 C
4,292,490 9/1981 Bell, Jr. et al. .................... 219/69 P
4,303,957 12/1981 Bell, Jr. et al. .................... 219/69 S Primary Examiner—C. C. Shaw
Attorney, Agent, or Firm—Staas & Halsey

[57] ABSTRACT

A power source circuit for use with an electric discharge machine which machines a workpiece by a discharge produced between an electrode and the work. When an arc forms in a working gap defined between the electrode and the work, the OFF period of a switching element inserted in the charging path of a capacitor for storing discharge energy is increased so that current flowing across the working gap is cut off for a longer period of time than in the case of a normal operation, thereby quickly restoring the insulating qualities of the gap following arcing.

7 Claims, 2 Drawing Figures

POWER SOURCE CIRCUIT FOR ELECTRIC DISCHARGE MACHINE

BACKGROUND OF THE INVENTION

1. Field of the Invention

The present invention relates to a power source circuit which is suitable for use with an electric discharge machine for cutting a workpiece by a discharge produced between an electrode and the workpiece.

2. Description of the Prior Art

In the case of the electric discharge machining of a workpiece through utilization of the discharge energy of a capacitor which is charged by a power source via a transistor or like switching element, when an arc forms between the electrode and the workpiece, the working efficiency drops and the worked surface is apt to be roughened. Such an arc, though not leading to a long-term, steady arc, often occurs momentarily under ordinary working conditions, thereby markedly impairing the working efficiency. To avoid this, it is desirable to eliminate an arc immediately when it develops, but prior art power sources for electric discharge machining are not provided with proper means therefor and hence they have the defect of poor working efficiency.

SUMMARY OF THE INVENTION

It is an object of the present invention to provide a power source circuit which is suitable for use with a wire-cut, electric discharge machine or the like.

Another object of the present invention is to provide a power source circuit for electric discharge machining which is capable of quickly eliminating an arc.

Yet another object of the present invention is to provide a power source circuit which enables enhancement of the electric discharge machining efficiency.

Briefly stated, according to the present invention, in a power source circuit in which a capacitor is charged by a power source via a switching element and the voltage across the capacitor is applied across the electrode and the workpiece, there are provided a first oscillator which produces a pulse signal which has predetermined ON and OFF periods; and a second oscillator which is started every time the working gap voltage becomes lower than a predetermined value and which alternately produces ON pulses of a longer period than that of the pulse signal of the first oscillator and OFF intervals of a longer period than the OFF interval of the pulse signal of the first oscillator. The switching element is driven by a logical product signal of the outputs from the first and second oscillators. When an arc forms in the working gap, the second oscillator is not started, so that current flowing to the working gap is cut off for a relatively long time, thereby quickly restoring the insulating qualities of the working gap.

DESCRIPTION OF THE PREFERRED EMBODIMENTS

Figure 1:
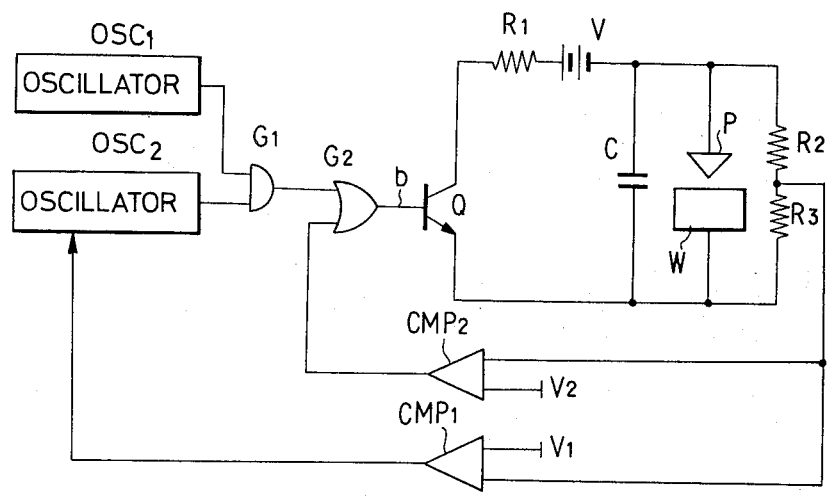
FIG. 1 is a block diagram illustrating the principal part of an embodiment of the power source circuit of the present invention.

In FIG. 1, reference character P indicates an electrode; W designates a workpiece; C identifies a capacitor; V denotes a DC high-tension power supply; Q represents a switching element, for example, a transistor; R1 to R3 show resistors; CMP1 and CMP2 refer to first and second comparators; OSC1 and OSC2 indicate first and second oscillators, G1 designates an AND circuit; and G2 identifies an OR circuit.

Figure 2:
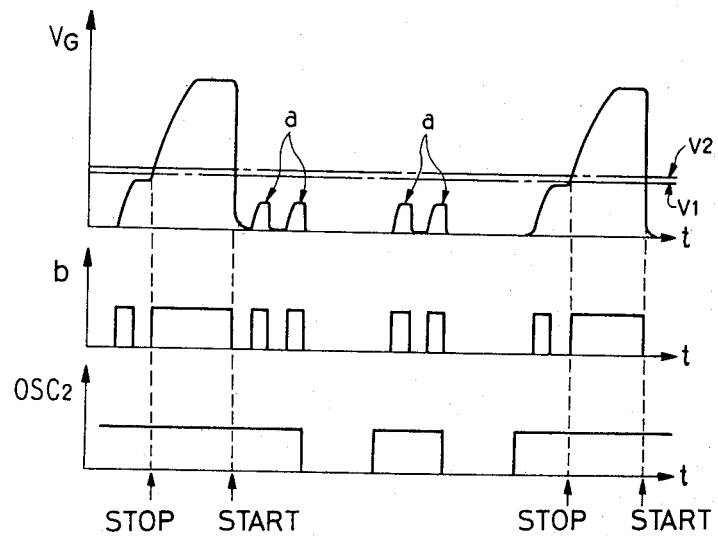
FIG. 2 is a waveform diagram showing examples of a working gap voltage $V_G$, the base signal b of a transistor Q and output pulses of a second oscillator OSC2 during the operation of the power source circuit shown in FIG. 1.

The capacitor C is charged by the DC high-tension power supply V via the resistor R1 and the transistor Q, and the charged voltage is applied across the electrode P and the workpiece W to produce a discharge in the working gap defined therebetween. A working gap voltage $V_G$ during working is detected by the resistors R2 and R3 and provided to one input of each of the first and second comparators CMP1 and CMP2. The first comparator CMP1 compares the working gap voltage $V_G$ and a reference voltage $V_1$ and, when the working gap voltage $V_G$ is reduced by the discharge to a level lower than a potential level $v_1$ shown in FIG. 2, the comparator CMP1 starts the second oscillator OSC2. Oscillator OSC2 stops oscillating when the working gap voltage $V_G$ is raised by the charging of the capacitor C to a higher level than the potential level $v_1$. In contrast thereto, the second comparator CMP2 compares the working gap voltage $V_G$ and another reference voltage $V_2$ and holds the transistor Q in the ON state when the working gap voltage $V_G$ remains above a potential level $v_2$ shown in FIG. 2.

The first oscillator OSC1 steadily applies pulse signals of a short pulse duration to the AND circuit G1, and usually the ON and OFF periods of the output from the first oscillator OSC1 can arbitrarily be set by an external setting circuit (not shown). The second oscillator OSC2, when started, first generates an ON pulse of a longer duration than that of the pulse signal from the first oscillator OSC1 and then an OFF interval of a longer duration than the OFF interval of the pulse signal from the first oscillator OSC; thereafter, the second oscillator repeats the alternate generation of such ON and OFF signals. When stopped, the second oscillator OSC2 stops its oscillation but continues to produce an ON signal. Next, a description will be given, with reference to FIG. 2, of the operation of the circuit shown in FIG. 1.

In the initial state, the voltage across the capacitor C is substantially zero and, accordingly, the second oscillator OSC2 is started by the output from the first comparator CMP1 and provides the alternating ON and OFF signals. Further, the output from the second comparator CMP2 is low-level. In this state, when the output pulse of the first oscillator OSC1 is provided to the base of the transistor Q via the AND circuit G1 and the OR circuit G2, the transistor Q undergoes an ON-OFF operation and the capacitor C is charged by the DC high-tension power supply V. At this time, if the electrode P and the workpiece W are sufficiently insulated from each other without forming an arc in the working gap therebetween, the charging voltage of the capacitor C, that is, the working gap voltage $V_G$, is able to exceed the aforesaid potential levels $v_1$ and $v_2$.

When the working gap voltage $V_G$ exceeds the potential level $v_1$, the oscillation of the second oscillator OSC2 is stopped by the output from the first comparator CMP1. But since the second oscillator OSC2 continues to yield an ON signal, the output pulses of the first oscillator OSC1 can be applied to the base of the transistor Q. In addition, since the transistor Q is held in the ON state by the output from the second comparator CMP1 from the moment when the working gap voltage $V_G$ exceeds the potential level $v_2$, the capacitor C is charged up to a value substantially equal to the voltage of the DC high-tension power supply V. And when a discharge is produced across the working gap a little time thereafter, the working gap voltage $V_G$ rapidly drops below the potential levels $v_1$ and $v_2$, so that the second oscillator OSC2 is restarted by the output from the first comparator CMP1 and the output from the second comparator CMP2 becomes low-level, so that the circuit is restored to its initial state.

The above-described operations are carried out under normal working conditions. When an arc is caused in the working gap, an instantaneous arc discharge is repeated as indicated by a in FIG. 2 and, as a result of this, the working gap voltage $V_G$ is unable to rise above a certain value. In other words, the working gap voltage $V_G$ does not exceed the potential levels $v_1$ and $v_2$. In the conventional power sources for electric discharge machines, since only the output pulse from the first oscillator OSC1 is supplied directly to the transistor Q, it is difficult to eliminate an arc once it forms. In the present invention, however, when an arc is caused, since the second oscillator OSC2 is held in its oscillating state, the current flowing across the working gap is cut off both by the short duration OFF intervals of the first oscillator OSC1 and the long duration OFF intervals of the second oscillator OSC2, thereby facilitating the recovery of the working gap. Accordingly, since normal charging and discharging can be quickly restarted, the frequency of discharge per unit time can be increased to provide for enhanced working efficiency.

As will be appreciated from the foregoing description, the potential levels $v_1$ and $v_2$, which are operating levels of the first and second comparators CMP1 and CMP2, are set to be a little higher than the highest voltage of the working gap voltage $V_G$ during arcing. It is also possible to set the potential level $v_1$ to be equal to or higher than the potential level $v_2$ so long as it lies within the abovesaid range and, in this case, the second oscillator OSC2 need not be held to the ON level when its oscillation is stopped. Also it is possible to employ an arrangement wherein the second comparator CMP2 is omitted and the output from the first comparator CMP1 is provided via a NOT circuit (not shown) to the OR circuit $G_2$.

As has been described in the foregoing, according to the present invention, when an arc is caused in the working gap, the OFF period of the transistor inserted in the charging path of the capacitor is increased to cut off the current flowing across the working gap for a relatively long period of time, so that the insulation quickly recovers during arcing. Accordingly, the discharge frequency can be increased to improve the working efficiency.

What is claimed is:

1. An improved power source for electric discharge machines of the type wherein a first digital oscillator drives a switching element in the charging circuit of a capacitor which repeatedly produces machining discharges through a gap between an electrode and a workpiece in order to machine the workpiece, the machining discharges occurring at a first voltage which is higher than the breakdown voltage of the gap following a machining discharge, wherein the improvement comprises:

first means for detecting the voltage across the gap;
second means responsive to the first means for turning the switching element OFF at least once, for a duration longer than that determined by the first oscillator, before the gap voltage has risen to a second voltage following a machining discharge, the second voltage being higher than the breakdown voltage of the gap following a machining discharge but lower than the first voltage at which a machining discharge occurs, said second means including a second digital oscillator having a frequency lower than the first digital oscillator, a first gate having a first input responsive to the output of the first oscillator and a second input responsive to the output of the second oscillator, and third means for communicating the output of the first gate to the switching element; and
additional means for keeping the switching element ON, following a machining discharge, as the gap voltage rises from a level above the breakdown voltage of the gap following a machining discharge to the first voltage at which a machining discharge occurs.

2. The power source of claim 1, wherein the first means comprises a voltage divider formed from first and second resistors series-connected at an intermediate connection point, the voltage divider being connected in parallel with the capacitor, and wherein the second means additionally comprises first comparator means for starting the second oscillator following a machining discharge, the first comparator means having a first input responsive to the voltage at the intermediate connection point between the first and second resistors, a second input responsive to a reference voltage which is substantially equal to the second voltage, and an output to which the second oscillator is responsive.

3. The power source of claim 2, wherein the third means comprises a second gate having an output to which the switching element is responsive and a first input responsive to the output of the first gate.

4. The power source of claim 3, wherein the second gate has a second input, and wherein the additional means comprises second comparator means having a first input responsive to the voltage at the intermediate connection point between the first and second resistors, a second input responsive to a third voltage which is higher than the breakdown voltage of the gap following a machining discharge but lower than the first voltage at which a machining discharge occurs, and an output to which the second input of the second gate is responsive.

5. The power source of claim 4, wherein the third voltage is higher than the second voltage and wherein the second oscillator is ON when it is not oscillating as a workpiece is being machined, the oscillations of the second oscillator beginning with an ON pulse each time the second oscillator begins oscillating.

6. The power source of claim 5, wherein the switching element is a transistor having a base connected to the output of the second gate.

7. A power source circuit for an electric discharge machine which receives electricity from a power supply means for supplying electrical power and produces an electrical discharge between a workpiece and an electrode separated from the workpiece by a gap, comprising a capacitor connected across the gap;

switching element means, responsive to a drive signal, for connecting the power source means to the capacitor to charge the capacitor;

means for generating a gap voltage signal that is proportional to the voltage across the gap; and pulse generating means responsive to said gap voltage signal for generating said drive signal for said switching element means, said pulse generating means including first oscillator means for generating a pulse output signal that has predetermined ON and OFF periods, a first comparator having one input responsive to a first reference voltage and another input responsive to said gap voltage signal, second oscillator means responsive to the output of said first comparator for generating an output signal that is ON when said gap voltage signal exceeds said first reference voltage and that oscillates when said gap voltage signal is less than said first reference signal, the oscillations being alternate ON and OFF pulses that are respectively ON for longer than said predetermined ON period and OFF for longer than said predetermined OFF period, a gate having one input responsive to the output signal of said first oscillator means and another input responsive to the output signal of said second oscillator means, a second comparator having one input responsive to said gap voltage signal and another input responsive to a second reference voltage, and gate means for OR-ing the outputs of said gate and said second comparator to produce said drive signal for said switching element means.

* * * * *